US010066857B2

(12) United States Patent
MacPherson

(10) Patent No.: US 10,066,857 B2
(45) Date of Patent: Sep. 4, 2018

(54) CONTROLLER FOR CONTROLLING AN AIR CONDITIONING SYSTEM AND RADIANT HEATING APPARATUS IN A BUILDING

(71) Applicant: Macpherson Engineering Inc., Regina (CA)

(72) Inventor: Murdoch MacPherson, Regina (CA)

(73) Assignee: Macpherson Engineering Inc., Regina (CA)

( * ) Notice: Subject to any disclaimer, the term of this patent is extended or adjusted under 35 U.S.C. 154(b) by 0 days.

(21) Appl. No.: 15/655,696

(22) Filed: Jul. 20, 2017

(65) Prior Publication Data

US 2017/0314828 A1    Nov. 2, 2017

Related U.S. Application Data

(62) Division of application No. 14/406,672, filed as application No. PCT/CA2013/000616 on Jul. 5, 2013, now Pat. No. 9,732,995.

(30) Foreign Application Priority Data

Jul. 6, 2012 (CA) .................................. 2782291

(51) Int. Cl.
*F25D 17/06* (2006.01)
*F25B 30/02* (2006.01)
(Continued)

(52) U.S. Cl.
CPC ............ *F25B 30/02* (2013.01); *F24D 3/1058* (2013.01); *F24D 3/14* (2013.01); *F24D 5/02* (2013.01);
(Continued)

(58) Field of Classification Search
CPC ........ F24F 11/02; F24F 5/0021; F24F 5/0089; F24D 3/14; F24D 11/02; F24D 3/12;
(Continued)

(56) References Cited

U.S. PATENT DOCUMENTS 5,542,260 A    8/1996    Bourne
2002/0020185 A1    2/2002    Carr
(Continued)

FOREIGN PATENT DOCUMENTS

WO    2007/062493 A1    6/2007
WO    2007062493 A1    6/2007

OTHER PUBLICATIONS

International Search Report and Written Opinion (PCT/CA2013/000616) dated Nov. 15, 2013, 8 pages.
(Continued)

*Primary Examiner* — Elizabeth Martin
(74) *Attorney, Agent, or Firm* — Michael A. Bondi; Moss & Barnett

(57) ABSTRACT

A method for cooling or heating a building is provided. An air flow can be created in an air duct and the air flow can be cooled or heated by an air conditioning system or furnace. The cooled or heated air flow can then pass through a heat exchanger connected to a radiant heating loop running through a floor or slab with a liquid circulating through them. When the airflow is being cooled or heated by the air conditioning system or furnace, the air flow will alter the temperature of the liquid circulating through the heat exchanger herefore the temperature of the slab. When the temperature of the slab varies from the temperature of the building, liquid that has been circulated through the radiant heating loop can be used to alter the temperature of the air flow passing through the heat exchanger.

5 Claims, 2 Drawing Sheets

(51) Int. Cl.
  *F24D 3/14*  (2006.01)
  *F24F 5/00*  (2006.01)
  *F24D 3/10*  (2006.01)
  *F24D 5/02*  (2006.01)
  *F24D 19/10*  (2006.01)
  *F25B 49/02*  (2006.01)
  *F24F 11/46*  (2018.01)

(52) U.S. Cl.
  CPC ..... *F24D 19/1009* (2013.01); *F24D 19/1084* (2013.01); *F24F 5/0017* (2013.01); *F24F 5/0089* (2013.01); *F25B 49/02* (2013.01); *F24F 11/46* (2018.01); *Y02E 60/147* (2013.01)

(58) Field of Classification Search
  CPC ... F24D 3/18; F24D 2220/2081; Y02B 10/70; Y02E 60/147
  See application file for complete search history.

(56) References Cited

U.S. PATENT DOCUMENTS

2005/0279343 A1 12/2005 Macpherson
2008/0276638 A1 11/2008 Seefeldt

OTHER PUBLICATIONS

International Search Report and Written Opinion (PCT/CA2013/000616) dated Nov. 15, 2013—7 pages.

US 10,066,857 B2

CONTROLLER FOR CONTROLLING AN AIR CONDITIONING SYSTEM AND RADIANT HEATING APPARATUS IN A BUILDING

REFERENCE TO RELATED APPLICATION

This application is a divisional of and claims priority to U.S. application Ser. No. 14/406,672, filed on Dec. 9, 2014, which claims priority to PCT Applic. No. PCT/CA2013/000616, filed on Jul. 5, 2013, which claims priority to Canadian Applic. No. 2782291, filed on Jul. 6, 2012. The contents of each of which are incorporated herein by reference.

FIELD

This invention is in the field of heating and/or cooling systems and more particular relates to methods of operating a radiant heating system to cool a cement floor or slab and then using this cooled floor or slab to cool an air flow.

BACKGROUND

Many buildings, especially residential buildings, use cooling systems to cool an air flow that is then passed into the building to cool the air in the building. Typically, these cooling systems comprise an air conditioner condenser and evaporator operating in conjunction to cool the air flow. An air flow is passed through the evaporator to cool the air flow and then it is routed through an air duct into the building where cooled air flow enters the building and cools the air in the building.

However, these systems use electricity to operate the air conditioner condenser. In some areas electrical power is subject to varying rates throughout the day, with consumers being charged higher rates for electricity used during peak hours. Other times, it is simply desirable not to constantly use electricity to power the air conditioner condenser.

Radiant heating systems are also now commonly used in buildings. These systems provide heat by having heated fluid circulated through them in a series of conduits or a heating loop that is provided in a cement floor or slab. Heat from the heating fluid circulating through the radiant heating loop is radiated to the surrounding floor or slab, heating the floor or slab and thereby radiating heat to the surrounding area.

There are also systems that can transfer heat between an air flow passing through the air duct of a forced air furnace and a cement floor or slab. A system such as this is shown in U.S. Pat. No. 7,410,104 to MacPherson the inventor of the current system and method.

SUMMARY

In a first aspect, a method of cooling a building is provided. The method comprises: using a blower to create an air flow through an air duct in the building, the air flow to be directed into the building; providing an air conditioning system with an evaporator in the air duct, the air conditioning system operative to cool the air flow in the air duct as it passes the evaporator; providing a radiant heating apparatus comprising: an air-to-fluid heat exchanger in the air duct downstream from the evaporator of the air condition system; a radiant heating loop operatively connected to the air-to-fluid heat exchanger and provided in a thermal store in the building; a liquid circulating through the air-to-fluid heat exchanger and the radiant heating loop. The air conditioning system and the radiant heating system can be first operated in a first state by cooling the air flow in the air duct using the air conditioning system and passing the cooled air flow through the air-to-fluid heat exchanger before the air flow is discharged into the building so that the cooled air flow cools the liquid circulating through the air-to-fluid heat exchanger and the cooled liquid being circulated through the radiant heating loop cools thermal store. Then when the thermal store is cooler than an ambient temperature in the building, the air condition system and the radiant heating system can be operated in a second state by turning off the air conditioning system so that the air flow through the air duct is at substantially the ambient temperature, circulating the liquid cooled by the thermal store through the radiant heating apparatus and cooling the air flow by passing the air flow through the air-to-fluid heat exchanger as the cooled liquid passes through the air-to-fluid heat exchanger before discharging the air flow into the building.

In a second aspect, a method of heating a building is provided. The method comprises: providing a forced air furnace with a blower connected to an air duct in the building; using the blower to create an air flow through the air duct in the building, the air flow to be directed into the building; providing a radiant heating apparatus comprising: an air-to-fluid heat exchanger in the air duct downstream from the evaporator of the air condition system; a radiant heating loop operatively connected to the air-to-fluid heat exchanger and provided in a thermal store in the building; a liquid circulating through the air-to-fluid heat exchanger and the radiant heating loop. The method can operate the forced air furnace and the radiant heating system in a first state by heating the air flow in the air duct using the forced air furnace and passing the heated air flow through the air-to-fluid heat exchanger before the air flow is discharged into the building, the heated air flow heating the liquid circulating through the air-to-fluid heat exchanger and the heated liquid being circulated through the radiant heating loop to heat the thermal store. When the thermal store is warmer than an ambient temperature in the building, the method can operate the forced air furnace and the radiant heating system in a second state by turning off the forced air furnace so that the air flow through the air duct is at substantially the ambient temperature, circulating the liquid heated by the thermal store through the radiant heating apparatus and heating the air flow by passing the air flow through the air-to-fluid heat exchanger as the heated liquid passes through the air-to-fluid heat exchanger before discharging the air flow into the building.

In a third aspect, a controller for controlling an air conditioning system and radiant heating apparatus in a building is provided. The air conditioning system comprises: an air conditioning condenser and an evaporator in a duct leading into the building, The radiant heating apparatus comprising an air-to-fluid heat exchanger provided in the duct and operatively connected to a radiant heating loop in a thermal store in the building; and a pump operative to circulate a liquid through the air-to-fluid heat exchanger and the radiant heating loop. The controller comprises: a processor; and a memory containing program instructions. The processor operative to in response to the program instructions: operate the air conditioning system and the radiant heating system in a first state by using the air conditioning system to cool an air flow in the air duct and pass the cooled air flow through the air-to-fluid heat exchanger before the air flow is discharged into the building and operate the pump to circulate the liquid through the radiant heating apparatus so that the cooled air flow cools the liquid circulating through the air-to-fluid heat exchanger and the cooled liquid being circulated through the radiant heating loop cools the thermal store; and when the thermal store is cooler than an ambient temperature in the building, operate the air conditioning system and the radiant heating system in a second state by turning off the air conditioning system so that the air flow through the air duct is at substantially an ambient temperature, and having the pump circulate the liquid cooled by the thermal store through the radiant heating apparatus to cool the air flow as the air flow passes through the air-to-fluid heat exchanger before discharging the air flow into the building.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
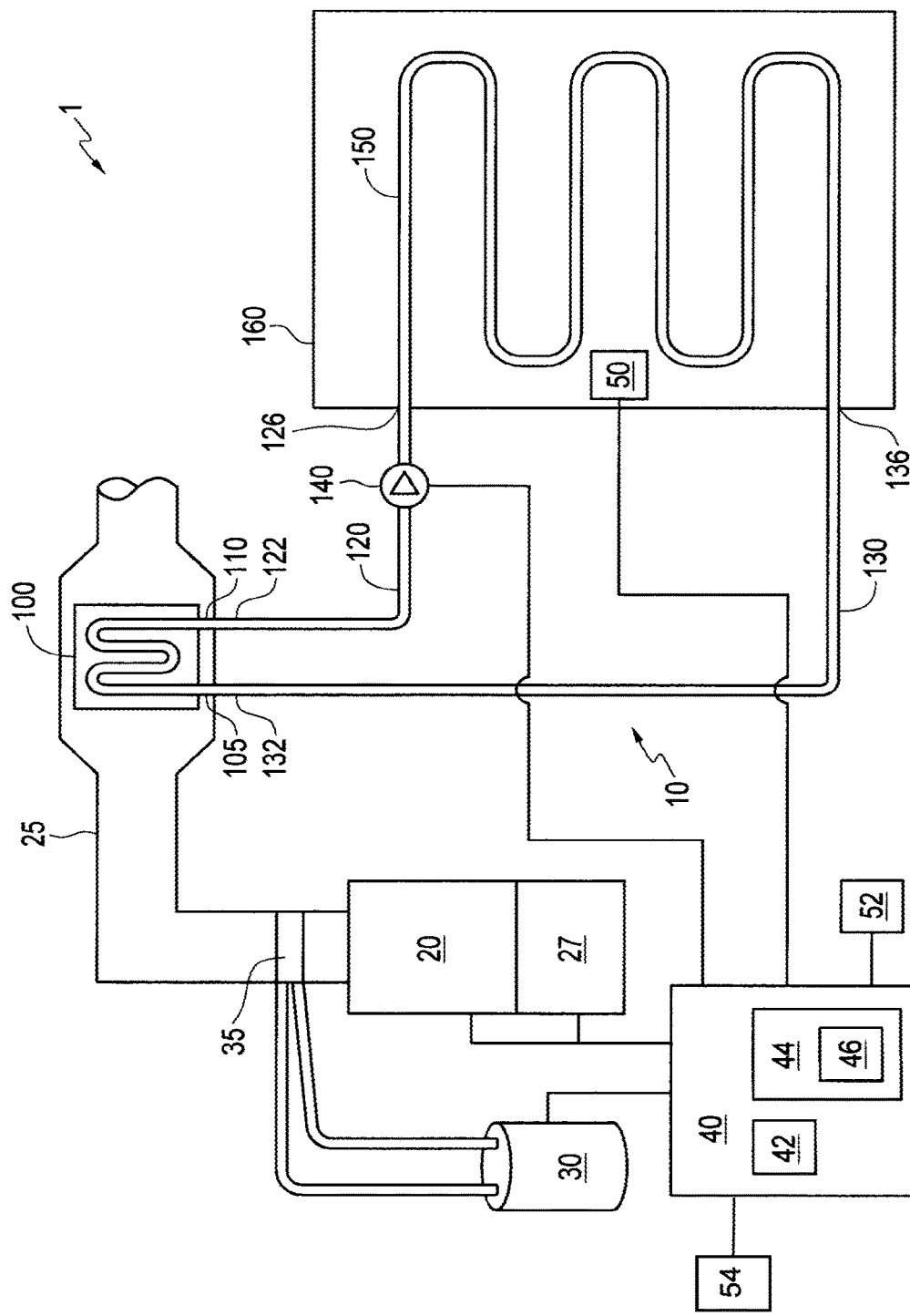
FIG. 1 is a schematic illustration of a cooling system.

FIG. 1 is a schematic illustration of a system 1 for heating and cooling a building. The system 1 can include a radiant heating apparatus 10 that can transfer heat between an air flow passing through an air duct 25 and a cement floor or slab. The radiant heating apparatus 10 can include: an air-to-fluid heat exchanger 100; a fluid supply conduit 120; a fluid return conduit 130; a pump 140; and a radiant heating loop 150. The radiant heating apparatus 10 can be installed in conjunction with a forced air furnace 20 and a blower 27 that is connected to an air duct 25.

The forced air furnace 20 can be any forced air furnace as commonly known by those skilled in the art, such as for example a gas furnace, oil furnace, heat pump, packaged outdoor heating/cooling units, etc. The forced air furnace 20 will typically be the primary source of heating and cooling for the building and will be connected to the air duct 25. The blower 27 is used in conjunction with the forced air furnace 20 to force air through the forced air furnace 20 and out into the air duct 25. The air duct 25 is operative to distribute an air flow passing through the air duct 25 throughout the building by eventually discharging the air flow into the building. The forced air furnace 20 will typically be controlled with a furnace thermostat that is located in the main occupied heated area. The furnace thermostat will be in electrical communication with the forced air furnace 20.

In addition to the forced air furnace 20, an air conditioning system can be provided to work in conjunction with the forced air furnace 20 and the air duct 25. The air conditioning system can be used to cool an unheated air flow passing through the air duct 25. Typically, this is done with the use of an air conditioning condenser 30 and an evaporator 35. The air conditioning condenser 30 is typically provided outside the furnace and the evaporator is installed in the air duct 25 downstream from the forced air furnace 25. The blower 27 can be used to create an air flow passing through the air duct 25 while the forced air furnace 25 is not on and not being used to heat the air flow. The air flow can be directed through the evaporator 35 where the air flow is cooled before it is passed through the air duct 25 and eventually out into the building the system is installed in.

The air-to-fluid heat exchanger 100 can be any air-to-fluid heat exchanger that is operative to transfer heat between the air flow in the air duct 25 and liquid circulating through the air-to-fluid heat exchanger 100. The air-to-fluid heat exchanger 100 can have an input connection 105 for liquid to be circulated into the air-to-fluid heat exchanger 100 and an output connection 110 for liquid to be circulated out of the air-to-fluid heat exchanger 100 after the liquid has completely circulated through the air-to-fluid heat exchanger 100.

The liquid that is circulated through the radiant heating apparatus 10 can be any liquid that is operative to store and transfer heat through the radiant heating apparatus 10, but would typically be water, treated water, or glycol.

The fluid supply conduit 120 can have a first end 122 and a second end 126. The first end 122 of the fluid supply conduit 120 is connectable to the output connection 105 of the air-to-fluid heat exchanger 100 and the second end 126 of the fluid supply conduit 120 is connectable to the radiant heating loop 150.

The fluid return conduit 130 has a first end 132 and a second end 136. The first end 132 of the fluid return conduit 130 is connectable to the input connection 110 of the air-to-fluid heat exchanger 100 and the second end 136 of the fluid return conduit 130 is connectable to the radiant heating loop 150.

The pump 140 can be any pump that is operative to circulate the liquid through the radiant heating apparatus 10. The pump 140 is illustrated in FIG. 1 as connected to the fluid supply conduit 120, however, someone skilled in the art will readily appreciate that the pump 140 could be incorporated into the radiant heating apparatus 10 in many locations including in the return supply conduit 130.

The radiant heating loop 10 can be a series of tubing or other conduits through which the liquid will circulate and heat or cool the area in proximity to the radiant heating loop 150. Typically, the radiant heating loop 150 will be in-floor or in-slab heating system. These in-floor or in-slab heating systems typically comprise a plurality of plastic tubing that is either cast into a cement floor of new construction or cast into a concrete slurry that is topped over an existing slab. The cement or other material that makes up the floor or slab the radiant heating loop 150 is embedded in can form a thermal store 260 storing up either heat or staying cool as a result of heat transfer between the radiant heating loop 150 and the thermal store 160.

A controller 40 can be provided for controlling the operation of the air conditioning system, the forced air furnace 20, the blower 27 and the pump 140 in the radiant heating apparatus 10. The controller 40 can include a processor 42 and a memory 44 with program instructions 46 saved in the memory 44. The processor 42 is operative to execute the instructions 46 in the memory 44 to control the air conditioning system, the forced air furnace 20, the blower 27 and the pump 140.

The controller 40 can include a temperature sensor 52 for measuring the ambient temperature of the air in the building and in one aspect, can have a temperature sensor 50 operably connected to it for measuring the temperature of the thermal store 160.

In operation, the air-to-fluid heat exchanger 100 is located within the air duct 25. When an air flow is directed through the air-to-fluid heat exchanger 100 by the blower 27, this air flow can cool the liquid passing through the air-to-fluid heat exchanger 100 if the air flow is cooler than the liquid in the air-to-fluid heat exchanger 100. For example, if the air conditioner condenser 30 and evaporator 35 are being used to cool the air flow flowing through the air duct 25, the air flow can be cooler than the liquid passing through the air-to-fluid heat exchanger 100 which in turn will cool the liquid passing through the air-to-fluid heat exchanger 100.

Alternatively, the air flow can heat the fluid passing through the air-to-fluid heat exchanger 100, increasing the temperature of this liquid, if the air flow has a greater temperature than the fluid in the air-to-fluid heat exchanger 100. This could occur when the forced air furnace 20 is being used to heat the air flow being directed into the air duct 25.

Once the liquid passes through the air-to-fluid heat exchanger 100, the liquid can then pass out of the output connection 110 through the first end 122 of the fluid supply conduit 120, into the fluid supply conduit 120, through the fluid supply conduit 120 and into the radiant heating loop 150. The liquid can then circulate through the radiant heating loop 150. If the fluid has been cooled by a colder air flow passing through the air-to-fluid heat exchanger 100, then this cooled liquid can cool the thermal store 160 surrounding the radiant heating loop 150 and eventually the room of the building above the thermal store 160. If the liquid has been heated by a warmer air flow passing through the air-to-fluid heat exchanger 100, then this heated liquid can heat the thermal store 160 that the radiant heating loop 150 is provided in and this heated thermal store 160 can subsequently heat the portion of the building above the thermal store 160.

Once the liquid has circulated through the radiant heating loop 150, the heating liquid will then pass into the fluid return conduit 130 and back into the air-to-fluid heat exchanger 100, where the temperature of the fluid can once again be changed by the air flowing through the air duct 25.

The radiant heating apparatus 10 can also be operated to cool air flowing through the air duct 25 when the thermal store 160 surrounding the radiant heating loop 150 is below the ambient temperature. The blower 27 can be used to blow air that has neither been heated by the forced air furnace 25 or the air condition system through the air duct 25. The result is an air flow that is at approximately ambient temperature. While this air flow is being forced through the air duct 25 by the blower 27, the pump 140 can be started and the liquid in the radiant heating apparatus 10 circulated. The thermal store 160 surrounding the radiant heating loop 150 can cool the liquid being circulated through the radiant heating loop 150. This liquid will then be circulated through the air-to-fluid heat exchanger 100. The cooled fluid circulating through the air-to-fluid heat exchanger 100 will draw some of the heat from the air flow coming into contact with the air-to-fluid heat exchanger 100, cooling the air flow passing through the air-to-fluid exchanger 100. This cooled air flow will then be dispersed throughout the building via the ducting connected to the forced air furnace 20.

The system 1 can be operated so that the air conditioning system is used to cool an air flow that will cool the air in the building. This cooled air flow will also be used to cool the liquid circulating through the air-to-fluid heat exchanger 100 which in turn will lower the temperature of the cement floor/slab making up the thermal store 160 surrounding the radiant heating loop 150. When the thermal store 160 has a temperature below the ambient temperature, the air conditioning system can be stopped so that the air flow is no longer cooled by the air conditioning system and the fluid that is circulating through the apparatus will now be cooled by the colder thermal store 160 and can be used to cool an air flow passing through the air duct 25. In this manner, the system 1 can be run at certain times to cool the thermal store 160 while cooling the temperature inside the building and at other times the system 1 can be operated so that the cooled thermal store 160 can supply the cooling desired for the building.

Figure 2:
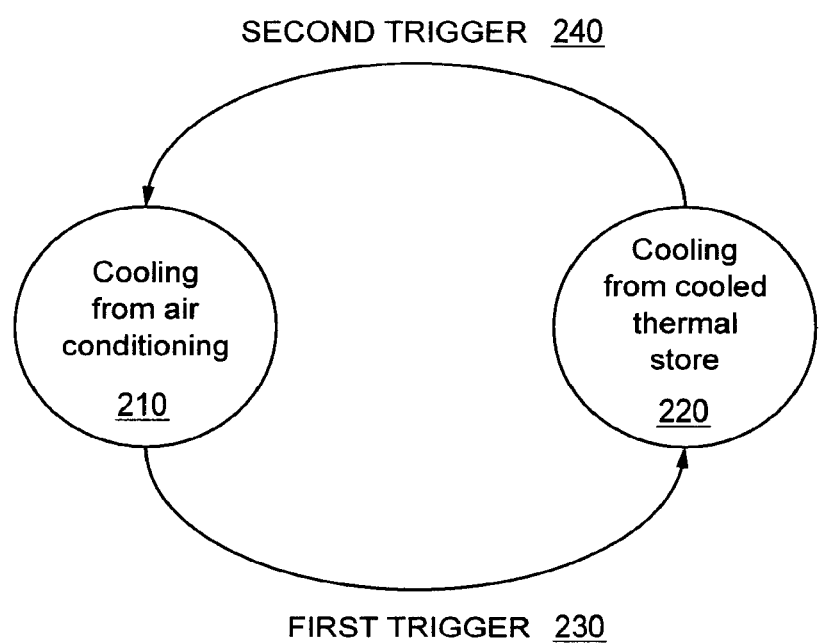
FIG. 2 is a state diagram of the modes of operating a cooling system as shown in FIG. 1.

FIG. 2 illustrates a state diagram illustrating two states of operation for the system 1. At state 210 the system 1 uses the air conditioning system to cool an air flow passing through the air duct 25 and the thermal store 160 formed from the cement floor or slab. At step 220 the system 1 reverses and the cooling is provided by the cooled thermal store 160, which is used to cool fluid in the radiant heating apparatus 10 and subsequently an air flow passing through the air duct 25.

At state 210 the radiant heating apparatus 10 can be used to cool the building by cooling the concrete or other material forming the thermal store 160 surrounding the radiant heating loop 150. An air stream can be forced through the air ducts 25 using the blower 27. This air stream can be cooled by the air conditioning condenser 30 and the evaporator 35, by passing the air stream through the evaporator 35 before the cooled air flow is routed through the air duct 25 and through the air-to-fluid heat exchanger 100. Liquid that is being circulated through the radiant heating apparatus 10 will circulate through the air-to-fluid heat exchanger 100 where it will be cooled by the cooled air flow before it is routed to the radiant heating loop 150 running through the thermal store 160. The cooled liquid passing through the radiant heating loop 150 will cool the thermal store 160 and subsequently the area above the thermal store 160. At the same time the building is being cooled by the cooled thermal store 160, the cooled air flow will be routed through the air duct 25 and into the building as well.

As the liquid passing through the radiant heating apparatus 10 continues to cool the thermal store 160 surrounding the radiant heating loop 150, the thermal store 160 can be cooled to a temperature below the ambient temperature in the building. In some cases, the thermal store 160 may typically maintain a temperature that is below the ambient temperature in the building without it having to be cooled. This can occur when the thermal store 160 is the cement floor of a basement or cement slab that is in contact with a ground surface that tends to be cooler than the ambient air temperatures in the building. As long as the system 1 is being operated in state 210, the thermal store 160 will continue to be cooled.

In state 220, the air conditioning system is turned off while an uncooled air flow continues to be forced through the air duct 25 by the blower 27 and the cooled thermal store 160 is used to cool the liquid in the air to fluid heat exchanger 100 which in turn will cool this air flow passing through the air duct 25. If the temperature of the thermal store 160 is below the ambient temperature of the air in the building, the air flow passing through the air duct 25 can be stopped being cooled by the air conditioning condenser 30 and the evaporator 35 while the blower 27 maintains an air flow through the air duct 25 and through the air-to-fluid heat exchanger 100. The liquid that is being circulated through the radiant heating apparatus 10 will still circulate through the air-to-fluid heat exchanger 100. However, rather than the cooled air flow having a temperature below the liquid passing through the air-to-fluid heat exchanger 100, and therefore cooling the liquid (as the system 1 operates in state 210), the uncooled air stream can have a temperature greater than the liquid passing through the air-to-fluid heat exchanger 100 and the liquid passing through the air-to-fluid heat exchanger 100 can then cool the uncooled air flow.

Cooling the air flow will cause the temperature of the liquid passing through the air-to-fluid heat exchanger 100 to be increased and the liquid, after passing through the air-to-fluid heat exchanger 100, will be circulated through the radiant heating loop 150. Where in state 210, the liquid passing through the radiant heating loop 150 cools the surrounding thermal store 160, now in state 220 the liquid is cooled by the colder thermal store 160. After this cooled liquid exits the radiant heating loop 150, the cooled liquid can be recirculated through the air-to-fluid intercooler 100 to cool the air flow passing through the air-to-fluid heat exchanger 100 before being once again recirculated to the radiant heating loop 150 to be cooled again.

State 220 can continue with the liquid being cooled by the cooler thermal store 160 and recirculated through the air-to-fluid intercooler 100 to cool a warmer air stream passing through the air duct 25 until the temperature of the thermal store 160 becomes close enough to the ambient temperature to make the cooling ineffective.

The operation of the system 1 can be changed from the first state 210 to the second stage 220 in response to a first trigger event 230. This first trigger event 230 could be as simple as a person manually switching the operation of the system 1 from state 210 to state 220. However, in another aspect, the first trigger event 230 could be the temperature of the thermal store 160 reaching a desired temperature below the ambient temperature. This temperature would indicate that the thermal store 160 is sufficiently cool so that the thermal store 160 can be used to cool the liquid in the radiant heating apparatus 100 and in turn the liquid can cool an air flow in the air duct 25.

If the controller 40 is used to control the system 1, the controller can use the temperature sensor 50 to measure the temperature of the thermal store 160 and when the thermal store 160 is cooled to the desired temperature, the controller 40 can stop the operation of the air condition system while continuing to run the pump 140 and circulate liquid through the radiant heating apparatus 10.

In a further aspect, the first trigger event 230 could be the increasing of the electrical rates at a certain time of day causing the cost to run the air conditioner condenser 30 and the evaporator 35 to be increased. By using this as a first trigger event 230, the system 1 could be used to allow the air conditioning condenser 30 and the evaporator 35 to be run while electrical charges are at a lower rate and cool the thermal store 160. Then when electrical rates increase during a day, such as at peak electrical usage times where electrical rates are increased by the electricity provider, the first trigger event 230 can occur and the system 1 can move into state 220 and the air conditioner condenser 30 and the evaporator 35 can be turned off to reduce electrical consumption and the cooled thermal store 260 used to cool the air flow and the building.

If the controller 40 is used to operate the system 1, the controller 40 can store the utility rates throughout the day in the memory 44 and when the utility rates are increased during the day, the controller 40 can turn off the air conditioning system while the pumps 140 continue to operate to circulate liquid through the radiant heating apparatus 10.

In a further aspect, the trigger could be the receiving of a signal 54 from an electrical utility provider. The controller 40 could receive the signal from the utility provider 54 and switch operation of the system 1 from the first state 210 to the second state 220 by turning of the air conditioning system (the air conditioning condenser 30 and the evaporator 35) while allowing the pumps 140 to keep running to continue circulating liquid through the radiant heating apparatus 10. In this manner, the utility provider could reduce the power demands on their electrical generation equipment at desired times even if they do not have varying electrical rates by simply sending out the signal to various systems and having them shut down the air conditioning systems to reduce the power demands on their electrical generation equipment. This could be done at times of peak usage, etc.

A second trigger event 240 can be used to change the operating state of the system 1 from the second state 220, with the liquid being cooled by the cooler thermal store 160 which is then used to cool the air flow in the air duct 25, to the first state 210, with air conditioning system being once again used to supply a cooled air flow to the building and cool the thermal store 160. The second trigger event 240 could simply be a user changing the operation of the system 1 when desired.

In another aspect, the second trigger event 240 could be the temperature of the thermal store 260 increasing to a point where the temperature of the thermal store 260 is no longer low enough relative to the ambient temperature to adequately cool the air flow passing through the air duct 25.

If the controller 40 is used to control the system 1, when the temperature reading taken by the controller 40 of the ambient temperature of the air in the building using temperature sensor 52 reaches a lower value sufficiently close to the temperature of the thermal store 160 measured by the temperature sensor 50, the controller 40 can switch the state of operation of the system 1 to the second first state 210 by once again turning on the air conditioning condenser 30 and the evaporator 35.

In a further aspect, the second trigger event 240 could also be an electrical rate being decreased at a certain time of day. Allowing the air conditioning system 1 to once again be run during a time when electric rates are lower.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A controller for controlling an air conditioning system and radiant heating apparatus in a building, the air conditioning system comprising: an air conditioning condenser, a blower and an evaporator in a duct leading into the building, the radiant heating apparatus comprising an air-to-fluid heat exchanger provided in the duct and operatively connected to a radiant heating loop in a thermal store in the building; and a pump operative to circulate a liquid through the air-to-fluid heat exchanger and the radiant heating loop, the controller comprising:

a processor; and a memory containing program instructions that are operable in conjunction with the processor to:

operate the air conditioning system and the radiant heating system in a first state by using the air conditioning system to cool an air flow in the air duct and pass the cooled air flow through the air-to-fluid heat exchanger before the air flow is discharged into the building and operate the pump to circulate the liquid through the radiant heating apparatus so that the cooled air flow cools the liquid circulating through the air-to-fluid heat exchanger and the cooled liquid being circulated through the radiant heating loop cools the thermal store; and when the thermal store is cooler than an ambient temperature in the building, operate the air conditioning system and the radiant heating system in a second state by turning off the air conditioning system so that the air flow through the air duct is at substantially an ambient temperature, and having the pump circulate the liquid cooled by the thermal store through the radiant heating apparatus to cool the air flow as the air flow passes through the air-to-fluid heat exchanger before discharging the air flow into the building.

2. The controller of claim 1 wherein the controller is operative to measure the ambient temperature in the building and a temperature of the thermal store and wherein the controller switches from operating the air conditioning system and the radiant heating system in the first state to the second state when the controller measures the temperature of the thermal store that is a desired temperature below the ambient temperature in the building.

3. The controller of claim 2 wherein the controller switches from operating the air conditioning system and the radiant heating system in the second state to the first state when a temperature differential between the temperature of the thermal store and the ambient temperature of the building reaches a predetermined value.

4. The controller of claim 1 wherein the controller switches from operating the air conditioning system and the radiant heating system in the first state to the second state when the electrical rates reach a predetermined amount.

5. The controller of claim 1 wherein the controller switches from operating the air conditioning system and the radiant heating system in the first state to the second state when the controller receives a signal from a utility provider.

* * * * *